United States Patent Office 2,760,485
Patented Aug. 28, 1956

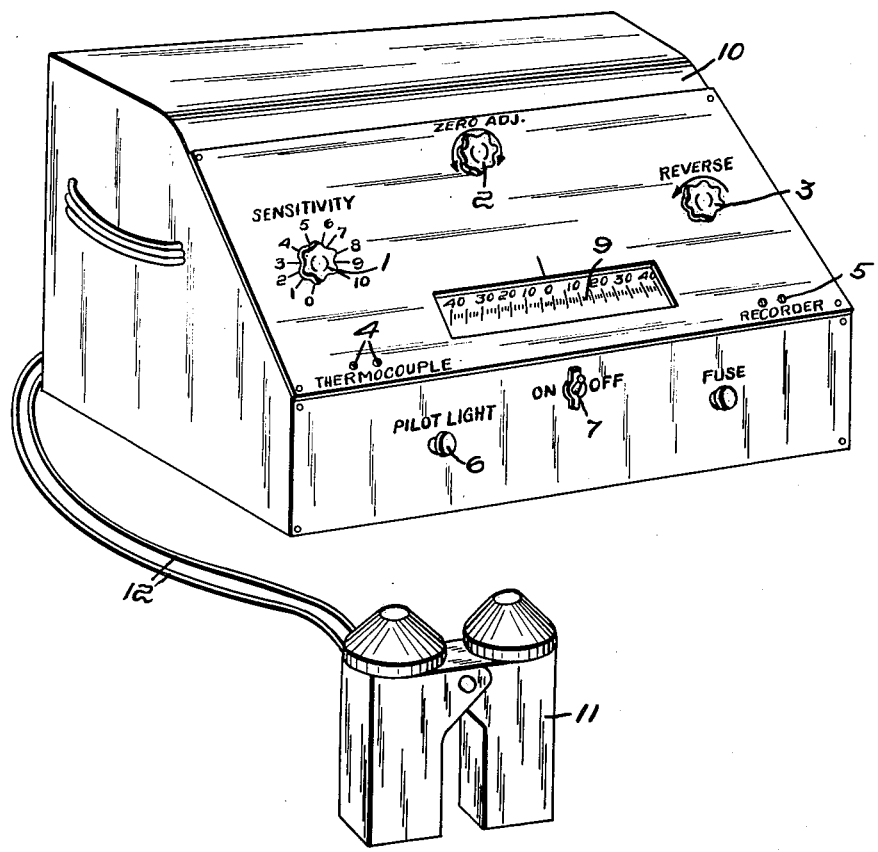

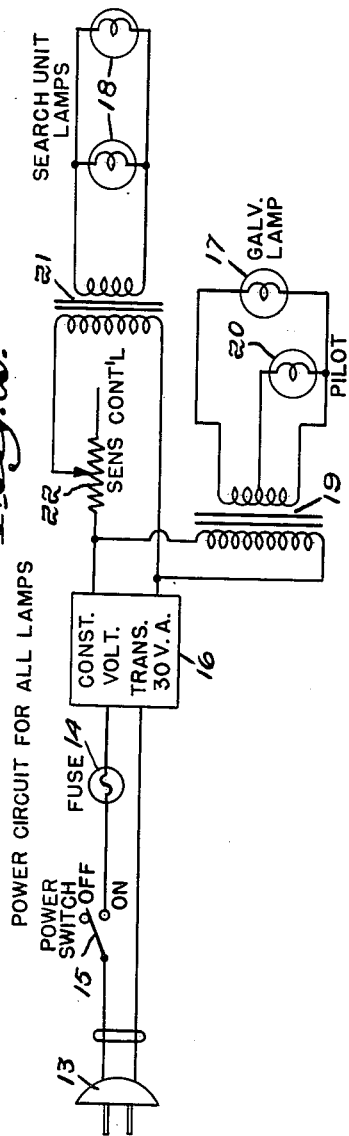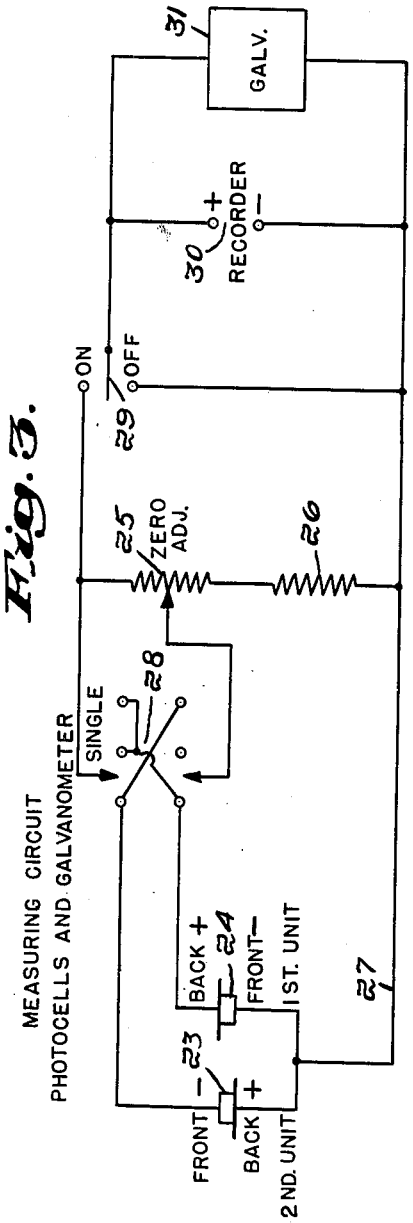

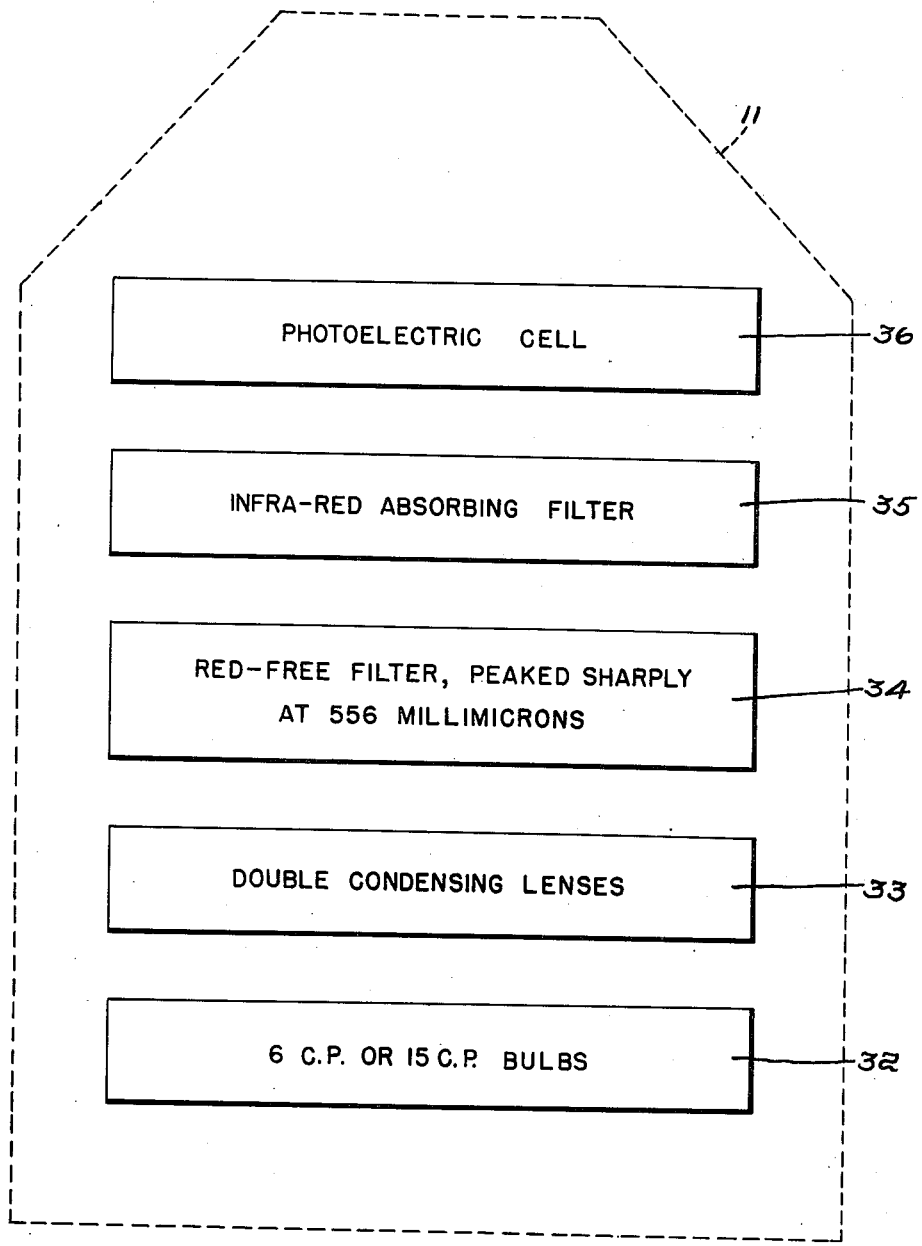

2,760,485

PROCESS OF AND APPARATUS FOR ELECTRONIC VISUAL NERVE-TRACING

George N. Adelman, Brockton, Mass.

Application June 6, 1952, Serial No. 292,099

3 Claims. (Cl. 128—2)

My present invention is an improved process or method of visual nerve-tracing for medical use, chiropractic, and other use, and includes a novel and efficient apparatus employing visual means including a photo-electric cell and adjusting devices to carry out the process, and is a continuation in part of my prior and copending application Serial No. 152,971 filed March 30, 1950, now abandoned.

While my present invention is suitable for use in various ways, it is of special and prime importance in locating and determining the precise nerve zone involved by impingement or interference with nerve transmission on each side of the spine.

Heretofore, it has been known that areas of hyperemia (congestion of the capillaries), generally too slight to be seen in ordinary light, existed at various levels adjacent the spinal column; and when tenderness is present the areas of greatest tenderness are the areas of the most marked hyperemia.

Prior to my present invention, no means were available to a practitioner to detect such deeper areas; and, furthermore, no prior instrument was sufficiently accurate nor had capacity for individual adjustment to accurately locate and visually indicate these areas.

I have discovered a method for the detection and measurement of the degree of congestion employed herein which consists in exploring the suspected areas with light beams of predetermined wave lengths ranges that may most effectively reflect from the congested areas, the range that has been found effective being in visible spectrum but not including the infra-red or heat rays.

While explained herein as primarily applied to spinal examinations, my invention is equally useful in nerve-tracing on other parts of the anatomy.

By means of my novel device, these exploring or searching light beams are directed into the skin, after passing thru suitable filters to eliminate the red rays, and the intensity of their reflection from various skin areas is indicated by readings on a sensitive galvanometer.

I may utilize a suitable electrically responsive circuit, to one or more photo-cells that are located in and form a part of the search lamps, and are, as such, directly in the paths of the reflected rays.

In carrying out my invention, I have provided an instrument with means for individual adjustment for each patient, thus setting the proper instrumentalities employed for detection and location of subluxations and other structural abnormalities adjacent the spine and designating areas of impinged nerve zones.

Hence, an important object of the electronic instrument I have made for use in carrying out my present method comprises visual indicating devices actively connected with two search units, preferably hinged for adjustment and hooked together for measurement of adjacent areas on each side of the spine.

There are no blood vessels in the upper layers of skin and since the blood vessels exist only in the papillary layer of the corium, it was impossible in the past to get down there by any known methods used at or before my invention.

The first four layers of skin: 1. stratum corneum, 2. stratum granulosum, 3. stratum sinosum, 4. basal cell layer—all do not contain any blood vessels; the blood gets there by seepage only. It is not until we get to the fifth layer, the papillary layer of the corium, that we find the capillaries and arterioles. That layer is reached by my search unit.

I provide a light source which will illumine deeply enough into the skin so as to get a reflective value therefrom and this light source is filtered so that none of the heat rays (infra-red rays) affect the capillaries by causing them to dilate because of the heat generated by that light source.

In addition to the use of the infra-red filter, I have found that a green pass filter which will accentuate the passing of light in the range of 556 millimicrons plus or minus 20 millimicrons is needed. This outlined combination of color filters and specified search lamps provide the required scanning light range necessary to provide an effective indication of the position of congested blood areas.

The search lamps which I prefer to use, constituting a search unit, are mounted in adjacent relation as a pair with their respective responsive photo-cells already mentioned, said search unit parts being of normal standard construction now on the market, and preferably incorporating amplifying elements therein.

As an energizing source for the search lamps I employ a suitable power supply properly regulated to supply a fixed light output. This may be in the form of suitable transformers, variable resistors, or inductors, or combinations of same. Where portability is desired, I may also employ a suitable battery-operated power supply. The photo-cells I prefer are of the self-generating type and their output energy is measured directly by a D. C. galvanometer of high sensitivity. This latter is connected to the desired cell by suitable selective switching means, and, in addition, circuit means are provided to adjust the photo-cells to zero and to adjust the respective photo-cell readings on the galvanometer to give equivalent readings for equal excitations of the reflections of light on a visual indicator.

The actual preliminary adjustments necessary to balance the individual photo-cell output against each other for any given adjustment of the twin search lamps, each lamp's reflection exciting its own cell, is made by scanning a uniformly reflective surface such as a uniformly pigmented ceramic tile or the like.

Referring to the drawings:

Fig. 1 is a view in perspective of a suitable cabinet with the control knobs and visual indicator and which, together with the search units, encloses the working parts of the apparatus;

Fig. 2 is a diagrammatic layout of the search unit power supply exploring lamps, and panel galvanometer lamp;

Fig. 3 is a corresponding layout of the photo-cell pickups and wiring of items in the search units, and Fig. 4 is an enlarged diagrammatic view within one of the pair of search units.

As shown in the drawings, Fig. 1 illustrates the external arrangement of the adjusting and control knobs suitably mounted in the case 10 and includes a sensitivity dial and knob 1, a "Zero" adjusting knob 2, and a control knob 3 labeled "Reverse." At 4 are indicated electric jack plugs for thermal pick-up accessories, which are optional, at 5 electric jack plugs for a suitable recording attachment; at 6 a pilot light; at 7 an on-and-off switch; at 8 an electric fuse, and at 9 the galvanometer scale, all in the front portion of the cabinet. The exploring or search units hinged together and light sources with the photo-cells are indicated at 11 and are connected to the instruments in the cabinet by current-conducting wires 12.

Referring now to schematic drawing Fig. 2, a power line input 13 is shown connecting on one side thru fuse 14 and switch 15 to a constant voltage output transformer 16 at one input terminal and directly to the other input terminal.

A transformer 19 is connected to the output of the constant output voltage transformer 16 which may be connected to a panel or pilot lamp 20 and galvanometer lamp 17 at its output.

A transformer 21 having a variable resistor 22 for sensitivity control in series with its primary circuit has its output connected to search lamps 18.

In Fig. 3 are shown pick-up photo-cells 23 and 24 connecting to an adjustable load circuit comprising a zero adjusting potentiometer 25 and fixed resistance 26 arranged in a mutual series thru lead 27 and three position switches 28. The latter allows for series and individual connection of the photo-cells to the load. This load connects thru switch 29 in the "on" position to the recorder 30 and galvanometer 31. In the "off" position, 30 and 31 are shorted out.

In Fig. 4 is shown the mechanical arrangement of the search lamps, filters, and pick-up photo-cells within the search unit 11 of Figs. 1 and 4. The parts arrangement in this unit in progression from the back of case include, in order, an exploring lamp 32, condensing lens 33, red-free filter 34, infra-red absorbing cell 35, and photo-electric cell 36.

Search units 11 of Fig. 1 each contain the elements 32 to 36 inclusive of Fig. 4.

The circuit of Fig. 2 provides the power for mutual electrical excitation of lamps 18—18, one being shown at 32, Fig. 4.

By means of the connections and circuit elements described thus far, there is provided the circuit means and components necessary to selectively control the intensity of light output in the search lamps, to selectively control the sensitivity of the cooperating photo-cells and to provide controlled input to the galvanometer.

It is possible to use a thermo-couple, not shown, for comparative purposes and where congestion causes heat in the subject being scanned by plugging same into input jack 4, Fig. 1.

The instrument having been adjusted to the normal body radiations of an individual patient by turning the dials 1, 2, and 3 as required to bring the indicator on the scale 9 to "Zero," the Search Units are then applied and the indications to right or left of the "Zero" mark will note the respective extent and intensity of the indications registered by the Search Units and the positions correspondingly noted by the practitioner on the patient where these indications occur.

Thus, the areas of congestion are readily and accurately discovered and, after treatment, can be again checked over by a repetition of the operation of applying the Search Units, thus checking the effects of the treatment.

Thus it will be appreciated that I have devised a process and developed an apparatus to carry out the same process, wherein the visual indications of pathological conditions in the capillaries can be effected, it never having been possible in prior devices to reach so deep in the capillaries.

Also I have developed apparatus which will register the heat waves from congested areas by eliminating all outside influence from the source of light utilized because I screen the heat waves from the source of light, thus enabling the photo-electric cells to pick up the heat indications from the areas under observation without intterference from the exploring light source.

Furthermore, I have developed a process and apparatus wherein I first adjust the instrumentalities to the conditions of the patient under treatment, thus insuring individual adjustment and accuracy in the resultant visual indications of the apparatus.

While I may use other search units than that disclosed herein, I have illustrated a preferred form in Fig. 4, but I have elected to claim various constructions of suitable search units in a corresponding application to which cross-reference will be duly made.

I claim:

1. An apparatus for exploring the lower layers of human skin and sensing relative blood conditions therein, comprising hinged search units, a galvanometer, said search units incorporating light-producing light-filtering and light-focusing elements radiating beams in the approximate range of 542 to 576 milli-microns, a fixed voltage adjustable current electric power supply for mutually exciting said light-producing elements, said units also incorporating self-generating photo-electric pick-up cells so connected that their additive currents can be zeroed, said cells and said elements of said search units being substantially identical, whereby mutually operating range relation to reflected rays from said beams may be had, an electrical indicating instrument and operating connections from said instrument to said cells, resistance and switching controls to zero the output of said cells when said search units equally scan identical light-reflecting surfaces for the purposes set forth.

2. An apparatus for exploring the lower layers of human skin and sensing relative blood conditions therein, comprising hinged search units, said units incorporating light-producing and focusing elements radiating beams in the approximate range of 542 to 576 milli-microns, said units also incorporating self-generating photo electric pickup cells in mutually operating range relation to reflected rays from said beams, a sensitive direct current galvanometer including circuit means for output and pickup adjustment, and circuit connections between said cells and said galvanometer.

3. An apparatus for exploring the lower layers of human skin and sensing relative blood conditions therein, comprising hinged search units, said search units incorporating light-producing and focusing elements radiating beams in the approximate range of 542 to 576 millimicrons, said units also incorporating photo tubes and cooperating amplifiers in the search units in mutually operating range relation to reflected rays from said beams, a sensitive direct current galvanometer, and circuit connections between said search units and said galvanometer.

References Cited in the file of this patent

UNITED STATES PATENTS

| | | |
|---|---|---|
| 1,961,913 | Reynolds | June 5, 1934 |
| 2,311,101 | Tuttle | Feb. 16, 1943 |